March 12, 1929.  G. B. EGGERT  1,704,731
CONVEYER FOR DISCHARGING BINS
Filed March 3, 1926  3 Sheets-Sheet 1

INVENTOR
BY Gustav Bernhard Eggert
ATTORNEYS

March 12, 1929.   G. B. EGGERT   1,704,731
CONVEYER FOR DISCHARGING BINS
Filed March 3, 1926   3 Sheets-Sheet 2

INVENTOR
Gustav Bernhard Eggert
BY
ATTORNEYS

March 12, 1929.  G. B. EGGERT  1,704,731
CONVEYER FOR DISCHARGING BINS
Filed March 3, 1926  3 Sheets-Sheet 3
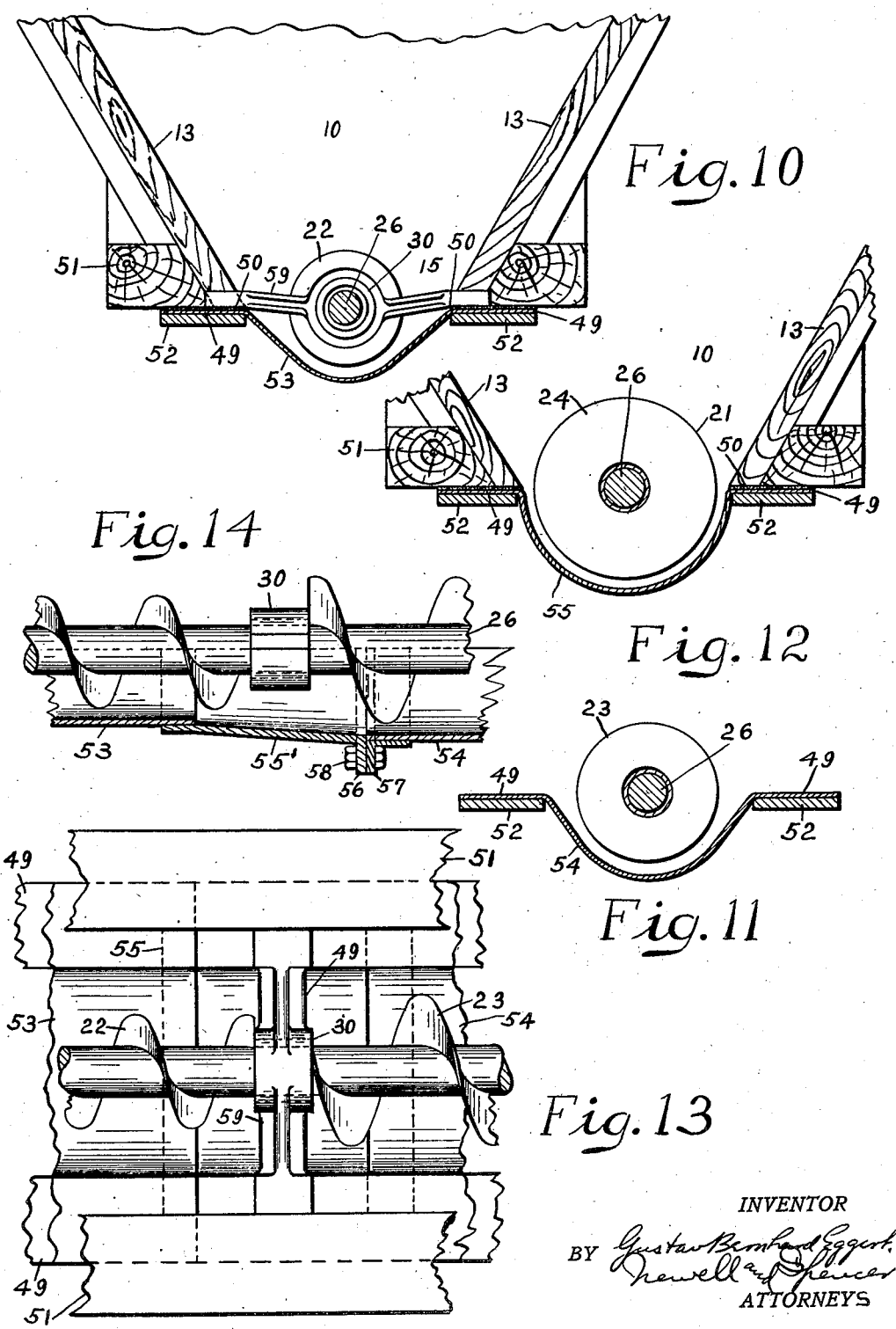

Patented Mar. 12, 1929.

1,704,731

UNITED STATES PATENT OFFICE.

GUSTAV BERNHARD EGGERT, OF SAGINAW, MICHIGAN, ASSIGNOR TO BAKER PERKINS COMPANY, INC., OF SAGINAW, MICHIGAN, A CORPORATION OF NEW YORK.

CONVEYER FOR DISCHARGING BINS.

Application filed March 3, 1926. Serial No. 91,917.

This invention relates to the discharging of storage bins such as are used to store grain, flour, chemicals, fertilizers, sanitary and cosmetic powders, colors, etc., and particularly to conveyers employed to discharge such bins, and it has for its general object so to construct and arrange a conveyer with respect to the bin with which it is associated that the discharging action of the conveyer shall be substantially uniform throughout a cross-sectional area of the bin.

Conveyers of various forms have long been employed to discharge bins for storing materials, such as those enumerated above, but the action of such conveyers in discharging bins has not been uniform, with the result that if the bin is not completely discharged at one time the surface of the material remaining in the bin is not at an even height throughout the bin, the material being usually discharged more rapidly from one side of the bin than from the other, with the result that the remaining material appears to be piled up against one side of the bin. This is usually unimportant with most materials which are stored in bins, but in the case of materials which tend to deteriorate rapidly if left long in a storage bin, it becomes important to insure the uniform discharge of the materials from the bin throughout any horizontal cross-section of the bin, so that if the contents of the bin are replenished from time to time with additional fresh material there may be assurance that none of the material remains in the bin for more than a predetermined length of time.

This is particularly important in large bakeries where flour for bread doughs and the like is stored in large storage bins and discharged through conveyers to weighing or other measuring mechanisms for properly proportioning the batches. If the conveyers do not discharge the flour uniformly across any cross-section of the bin and the bins are not completely emptied before fresh material is put in them, there will be a tendency of the material to collect on one side of the bin where the action of the conveyer has not been as rapid as on the other, with the result that the fresh material put in the bin will usually be discharged before the material of the previous lot has completely been discharged, and thus the material of the previous lot may be left in the bin for a considerable time in the event that the bin is at no time completely discharged.

In the warm, moist air of bakeries, this is particularly objectionable since flour tends rapidly to deteriorate in such an atmosphere. Such deterioration is objectionable both in the material itself which is thus left in the bin, and also because of its tendency to contaminate the fresh material added to the contents of the bin.

The present invention aims so to construct a conveyer for discharging bins that the conveyer will not tend to discharge one part of a bin more than another and thus maintain the material in the bin substantially on an even level.

The invention will be clearly understood from the accompanying drawings illustrating the invention in its preferred forms, and the following detailed description of the construction therein shown.

Referring to the drawings forming a part of this application, and in which two forms of the invention are illustrated:

Fig. 3 is a section on line 3—3 of Fig. 1;

Fig. 4 is a section on the line 4—4 of Fig. 1;

Fig. 5 is a section on the line 5—5 of Fig. 1;

Fig. 6 is a plan view showing a detail of the conveyer and the trough in which said conveyer operates;

Fig. 9 is a longitudinal section through the lower portion of a bin or container showing a conveyer of modified construction mounted therein;

Figs. 10, 11 and 12 are transverse vertical sections through a still further modified form of the invention;

Fig. 13 is a plan view showing a detail of the modified form of the invention shown in Figs. 10 to 12, inclusive; and Fig. 14 is a vertical longitudinal section through this last-mentioned form of the invention.

Figure 1:
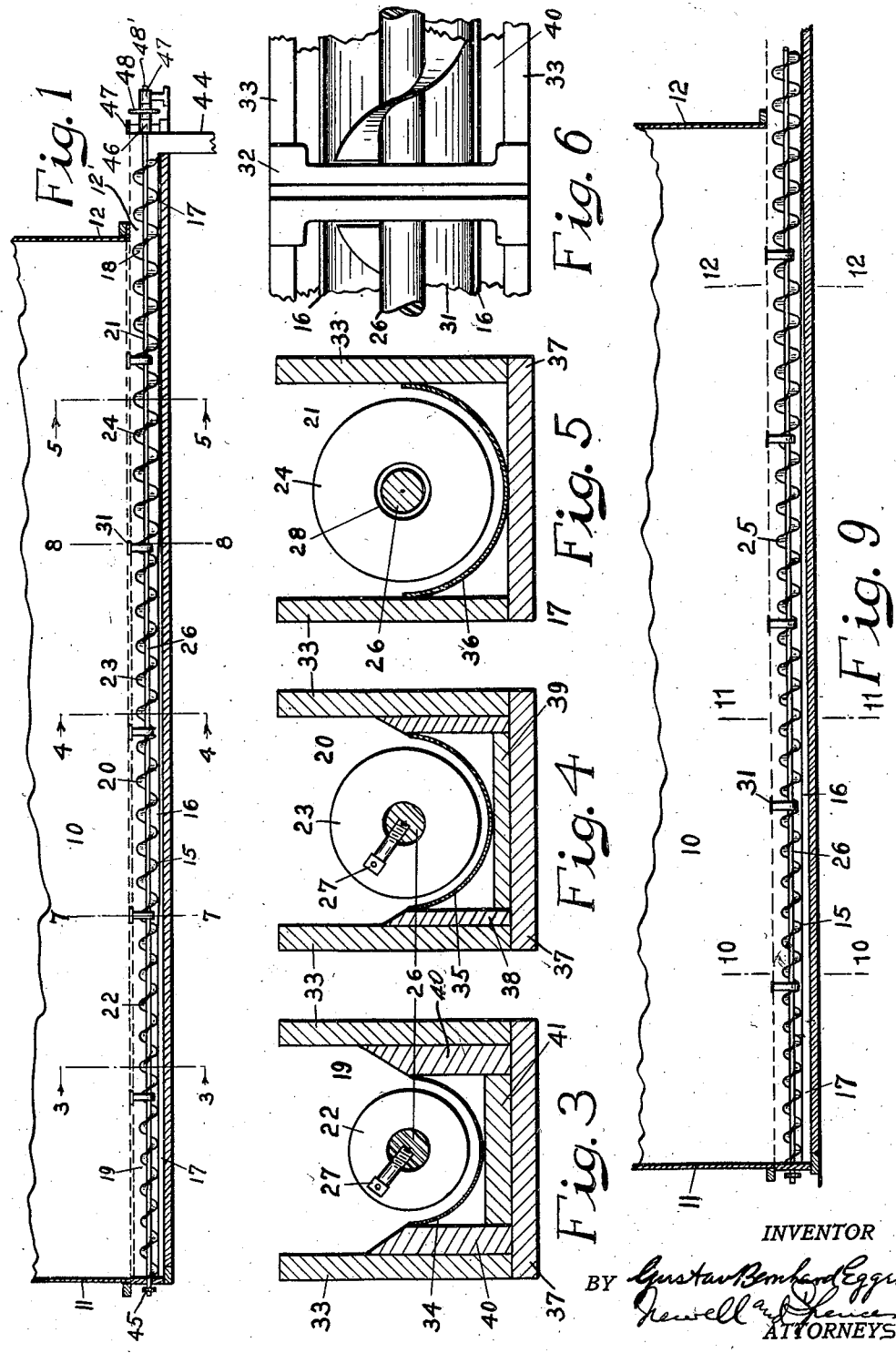
Fig. 1 is a longitudinal vertical section through the lower part of a bin or container having a conveyer therein constructed in accordance with the present invention.
Figure 2:
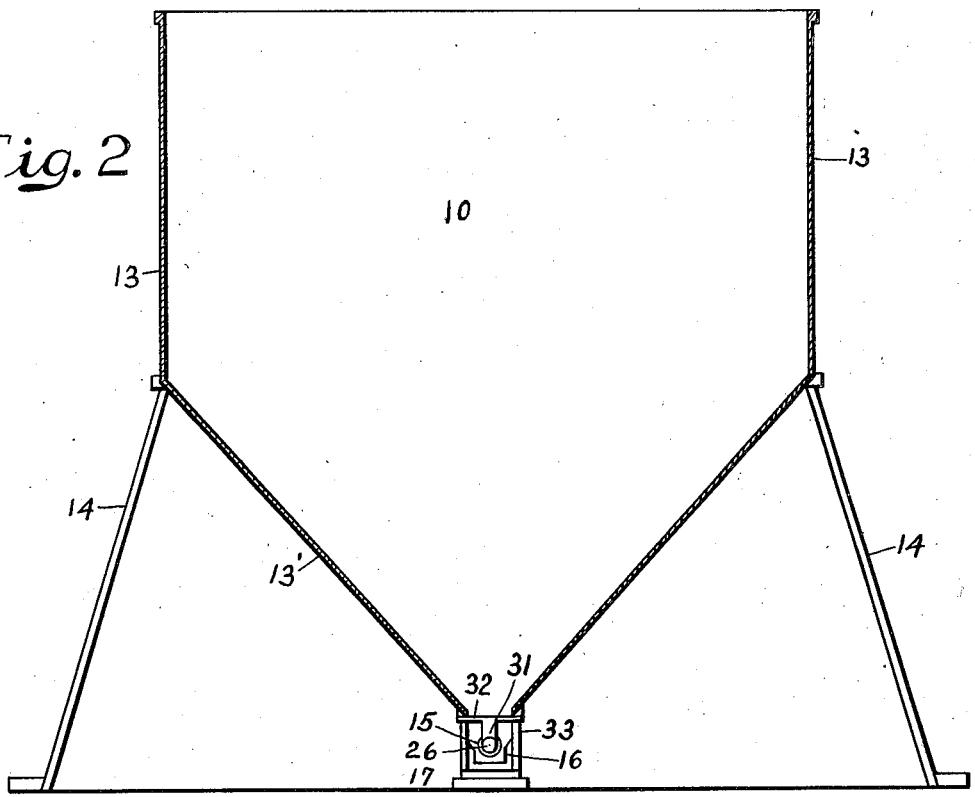
Fig. 2 is a vertical transverse section through the bin or container.

Referring more specifically to the drawings, the reference numeral 10 designates a bin of relatively large dimensions, about thirty-three feet in length. The bin 10 has a rear end wall 11, a front end wall 12 and side walls 13. The side walls 13 have converging lower portions 13', and said bin is supported by stays, props or the like 14, the upper ends of which engage beneath the straight portion of the side walls 13, all of which is old and well known, and used here merely for the purpose of more clearly setting forth the present invention. The forward wall 12 of the bin or container is provided with an opening 12' through which the material within the bin or container may be discharged therefrom.

The material contained in the bin is discharged through a trough-like member 16 and the converging portion 13' of the side walls 13 overlie the side edges of this trough 16 in order that the material in the bin or container will be directed thereinto.

This trough 16 is mounted in a housing, which in turn is rectangular in cross-section, and said housing comprises side walls 33 and a bottom wall 37.

This trough through which the material is moved is preferably extended beyond the discharge opening 12' of the bin or container, as shown in Fig. 1, and has a suitable discharge chute 44 communicating therewith. The trough 16 is divided into a plurality of sections of which there are three shown in the present illustration of the invention, and said sections are designated by the reference numerals 34, 35 and 36. The section 34 is positioned at the rear of the bin or container, the section 35 intermediate between the ends of the bin or container, and the section 36 adjacent the front wall or the discharge end of the bin or container. The three sections are about equal in length.

The material to be discharged from the bin or container is moved through the trough by a conveyer, and said conveyer is preferably of the screw type. This conveyer in the present illustration of the invention is divided into three sections, 19, 20 and 21. Each of these sections comprises a spiral blade 22, 23 and 24, respectively. The spirals of each of these blades have the same diameter, but the diameter of spiral 22 of section 19 near the closed end of the bin is smaller than that of spiral 23 of section 20 in the middle part of the conveyer, and the diameter of spiral 23 smaller than that of spiral 24 in section 21 nearest to the outlet of the bin. For the apparatus described and shown in the drawings the proportion of the diameters of the spirals 22, 23 and 24 to each other is $=4:5:6$. The spiral blades 22 and 23 are secured to the shaft 26 by means of the set screws or the like 27. The spiral blade 24 of the section 21, however, is carried by the sleeve 28 and as more clearly shown in Fig. 8, one end of this sleeve receives the forward end of the heretofore mentioned shaft 26. A shaft 29 projects into the opposite end of the sleeve 28 and is secured to said sleeve by a cross pin 29', the sleeve 28 being secured to the shaft 26 by a cross pin 26'.

The shaft 26 and the shaft 29 are mounted in hangers 31 and said hangers are formed with laterally projecting wings 32 by means of which they are secured to the upper edge of the side walls 33 of the housing in which the trough and the conveyer are mounted. At the point where the hangers occur, the spiral blades of the conveyers are interrupted or have sections cut therefrom, as designated by the reference numeral 23', in order that these spiral conveyers may be free to rotate without interference with the hangers. Each of the hangers 31 is provided with a bushing 30 which forms a bearing for the shaft mounted therein.

By reference to Fig. 1, it will be noted that section 19 of the spiral conveyer is of smaller diameter than the section 20 thereof and that the section 20 of said conveyer is of smaller diameter than the section 21 thereof. It will also be noted that the conveyer section of smallest diameter is positioned at the rear of the bin or container, at that point most remote from discharge of the bin or container, the section of intermediate diameter being positioned at substantially the central portion of the bin or container, while the section 21 of largest diameter is positioned at the front of the bin or container and extends through the discharge opening 12' thereof ending at a point adjacent the discharge chute 44. By reference to Figs. 3 to 5, it will be noted that the trough 16 which is formed of sheet metal and is substantially semi-circular in cross-sectional shape is divided into three sections 34, 35 and 36. The transverse dimension and the transverse curvature of these sections 34, 35 and 36 of the trough 16 are such that the peripheral edge of the spiral blade of the section of the conveyer operating in any one section of the trough will be substantially concentric with the curvature of that section of the trough in which it is mounted, and it will be further noted that the peripheral edge of the spiral blade of the conveyer sections will be slightly spaced with respect to the trough section in which it operates, these spacings being practically equal for all three sections.

Figure 8:
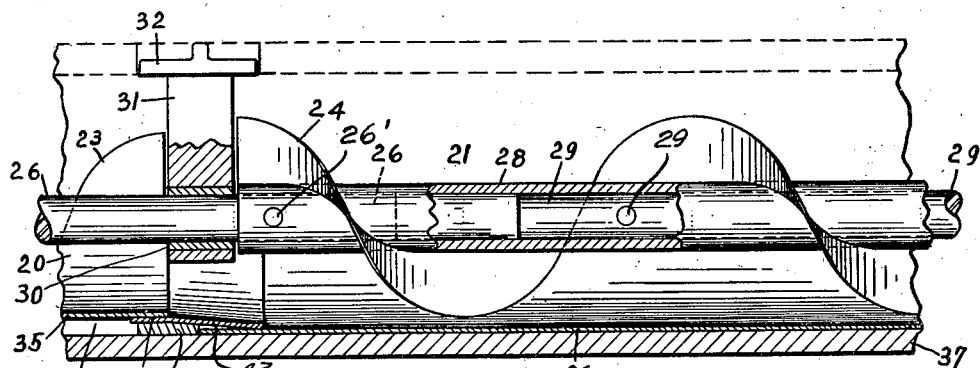
Fig. 8 is a similar view showing the manner of constructing a portion of the conveyer.
Figure 7:
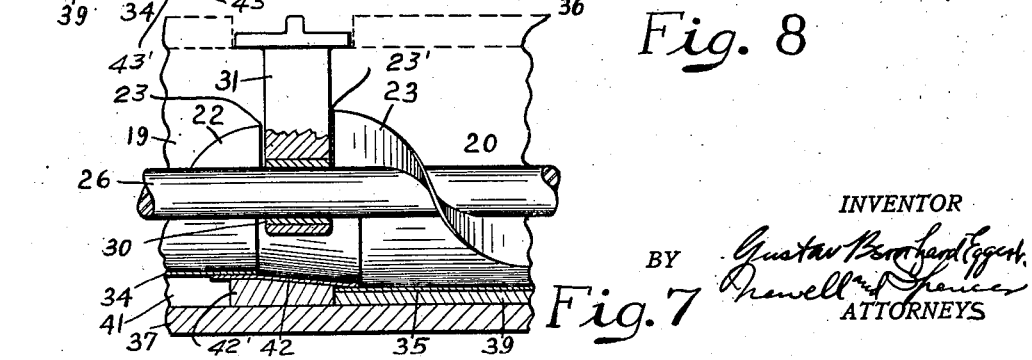
Fig. 7 is a longitudinal section showing a detail of the trough in which the conveyer operates and the manner in which the conveyer is mounted in the trough.

Inasmuch as the trough section 35 is larger than the trough section 34 and the trough section 36 is larger than the trough section 35, it becomes necessary to provide suitable means for connecting these trough sections one to the other. In Fig. 7 the connection between the trough sections 34 and 35 is shown as a bridge plate 42 supported by a suitable block 42' mounted on the bottom wall 37 of the trough housing. In Fig 8 the connection between the trough sections 35 and 36 is shown as a bridge plate 43 resting upon a block 43' carried by the bottom wall 37 of the trough housing. In each instance the bridge plate extends from a point to the rear of the front end of the smaller trough section to a point in front of the rear end of the larger trough section, which construction insures that the material will be passed from one trough section into the other without loss or waste thereof. That shaft section 29 upon which the conveyer section 21 is mounted extends through a bearing 46 located beyond the front wall 12 of the bin or container and for driving the shaft 29 there is a driving wheel 48 connected to any suitable source of power. The reference numeral 47 designates the forward end wall of the chute 16 and the reference numeral 47' designates a bearing member for the free forward end 48' of the shaft 29.

Assuming now that the bin is filled with material to be discharged: Upon movement of the conveyer through the medium of its driving wheel, 48, all three of the conveyer sections will be simultaneously driven to move the material forwardly of the bin and discharge the same through the spout 44.

As heretofore stated, the spiral blades 22, 23 and 24 of the conveyer sections 19, 20 and 21, respectively, increase in diameter in due proportion required by the case, that is to say, the spiral blade 23 of the section 20 is of duly greater diameter than the spiral blade 22 of the section 19 but of duly less diameter than the spiral blade 24 of the section 21. By this construction, it will be readily appreciated that, as the conveyer is operated due to the proper increase of capacity of the conveyer in the direction of the discharge end thereof, an equal amount of material will be taken from the bin or container at all points between the front and rear wall thereof or throughout the length of the conveyer, thus causing the upper surface of the material in the bin or container to at all times maintain a level rather than discharge from the rear end only of the conveyer, which would result so long as any material remained at the rear if the conveyer were of uniform diameter throughout its length.

In Fig. 9 there is shown a slightly modified form of the invention in which the increasing capacity of the conveyer in the direction of the front or discharge end of the bin is obtained by a gradual increasing of the diameter of the subsequent convolutions thereof in the direction of the discharge end of the bin. The conveyer shown in Fig. 9 has the same length as that shown in Fig. 1, and the proportion of the diameter of the spiral nearest to the wall 11 to that of the spiral nearest to the outlet is =2:3.

In some instances, for example, in cases where the material to be conveyed is of a very light nature and its particles of considerable size, of irregular shape and inclined to cling together to the extent that movement through the upper part of the housing into the troughlike member is not free and easy, it has been found advantageous to do away with the housing for the trough, and in such instances the trough in which the conveyer operates is attached directly to the bottom of the bin or container. Such a modified construction is shown in Figs. 10 to 14 for the step-by-step conveyer represented in Figs. 1–8. In this form of the invention those sections of the trough, through which the smaller portion of the conveyer or that portion having the least capacity operates, do not conform in cross-sectional shape to the cross-sectional shape of the conveyer, that is to say, the cross-section is not semi-circular. That section, however, of the trough in which the larger portion or that portion of the conveyer having the greatest capacity operates, is substantially semi-circular in cross-sectional form and is concentric with the conveyer, as more clearly shown in Fig. 12. The distance of any lowest point of the spiral of a section from the point vertically beneath the same of the trough, in which this spiral rotates, is practically equal for all the sections of the conveyer.

A construction of the last-mentioned character is shown in Figs. 10 to 14, and in said figures the bin or container is designated by the reference numeral 10 having inclined side walls 13, as in the heretofore described form of the invention. The trough in which the smallest spiral 22 of the conveyer rotates, is designated by the reference numeral 53, and to provide for its fastening to the bin or container 10 the trough is provided with longitudinally extending side flanges 49, the trough being secure in position by longitudinally extending plates 52 in any desired manner. In order to prevent sifting of the material at the point where the side flanges 49 of the trough engage the bin or container 10, suitable packing 50 may be employed if desired. The shaft 26 of the conveyer in this form of the invention is mounted in hangers 59 which bridge the trough, and said hangers are provided with bushings 30 which form bearings for the shaft 26.

In this form of the invention there are sections of trough of different transverse dimensions, of which in the present instance there are two shown, said sections being designated by the reference numerals 53 and 54. Connecting the sections 53 and 54 is a bridge plate 55 having a flange 56 and over which the forward end of the trough section 53 overlaps, as shown in Fig. 14. The rear end of the trough section 54 is supported by a flanged member 57 secured to the flange 56 of the bridge plate 55 by bolts or other suitable fastening means 58. It is to be understood that the connection between the forward end of the trough section 54 and the trough section 55 will be similar to this construction, and therefore it is not illustrated herein.

In the form of the invention just described, if the material be of a light nature and in the form of relatively large particles, it will be seen that there is perfectly free flow from the bin into the trough, in which the conveyer rotates and no danger of the action of the latter being disturbed in any way. This free flow is still more facilitated by the transverse shape of the trough, which transverse shape, as heretofore stated, does not conform to the cross sectional or transverse shape of the conveyer. When, however, the material reaches the forward end of the conveyer where the trough section does correspond in cross-sectional form to the cross-sectional form of the conveyer and is concentric therewith, the material will be free to move through its section due to the increase of space between the convolutions of the conveyer and the increase in the diameter thereof.

From the foregoing it will be apparent that when a conveyer of this character is placed at the bottom of a relatively long bin, such as used in modern bakeries for containing flour and when the conveyer is operated to discharge the flour, the conveyer, in consequence of its duly increasing capacity in the direction of its conveying movement, will receive a certain amount of material from the bulk of material at each point throughout its entire length, the amounts received at successive points along the path of travel of the material being substantially uniform, thus causing the top of the material in the bin or container to remain even or level. It will also be apparent that with the top of the material falling in a substantially true level plane, any material added will not be discharged by the conveyer until all of that material contained in the bin or container before the addition was made, is discharged.

From the foregoing it will also be apparent then that no material will be left in the bin or container sufficiently long for it to spoil, and therefore to act to contaminate the new material which may be periodically added.

It is to be understood, however, that the invention is not limited to the particular construction of the illustrated embodiments thereof, and that it may be embodied in other forms within the scope of the appended claims.

What is claimed as new is:

1. In an apparatus for discharging storage bins, a bin having slanting sides, a housing connected to the slanting sides of the said bin, a conveyer shaft extending in the said housing from its outlet to its opposite closed end, hangers carried by the said housing for supporting the said shaft, a plurality of screw conveyer spirals fixed to the said shaft between the said hangers and divided into a distinct number of sections, the spirals of each section having the same diameter, but the diameters of the different sections increasing in length from that section nearest to the closed end of the said housing to the outlet thereof, a plurality of half-circular troughs, corresponding to the said sections and arranged coaxially to the said shaft, and in all sections at an equal distance from the corresponding spirals rotating therein, and bridges connecting the said troughs.

2. In an apparatus for discharging storage bins, a bin having slanting sides converging towards each other, brackets fixed to the bottom ends of the slanting sides of the said bin, a conveyer shaft revolubly carried by the said brackets and extending from the closed end of the said bin to its outlet, a plurality of screw conveyer spirals fixed to the said shaft between the said brackets and divided into a distinct number of sections, the spirals of each section having the same diameter, but the diameters of the different sections increasing in length from the section nearest to the closed end of the said bin to the outlet thereof, a plurality of curved troughs corresponding to the said sections and fixed with their tops to the bottom ends of the slanting sides of the said bin, the distance of any lowest point of the spirals of the different sections from the point vertically beneath the same of the trough belonging thereto, being equal for all the said sections, and bridges connecting the said troughs.

3. In combination with a storage bin, a material-discharging spiral conveyer for discharging material at the base of said bin, comprising a series of axially aligned conveyer sections secured together, each of said sections having a spiral blade defining a plurality of convolutions of the same diameter, pitch and carrying capacity throughout the length of the section, the blades in the several sections increasing progressively in diameters and carrying capacity in successive sections toward the discharge end of the conveyer, a trough enclosing the blades of each section, said troughs also increasing progressively in diameters, and means for operatively connecting the ends of successive troughs.

Signed at Saginaw, Michigan, this 25th day of February, 1926.

GUSTAV B. EGGERT.